I. SMYTH.
AUTOMOBILE.
APPLICATION FILED DEC. 13, 1909.

995,037.

Patented June 13, 1911.

4 SHEETS—SHEET 1.

I. SMYTH.
AUTOMOBILE.
APPLICATION FILED DEC. 13, 1909.

995,037.

Patented June 13, 1911.

4 SHEETS—SHEET 3.

Witnesses
W. C. Smith
B. J. Richards

Inventor
Isaac Smyth
by Joshua R. H. Potts
his Attorney.

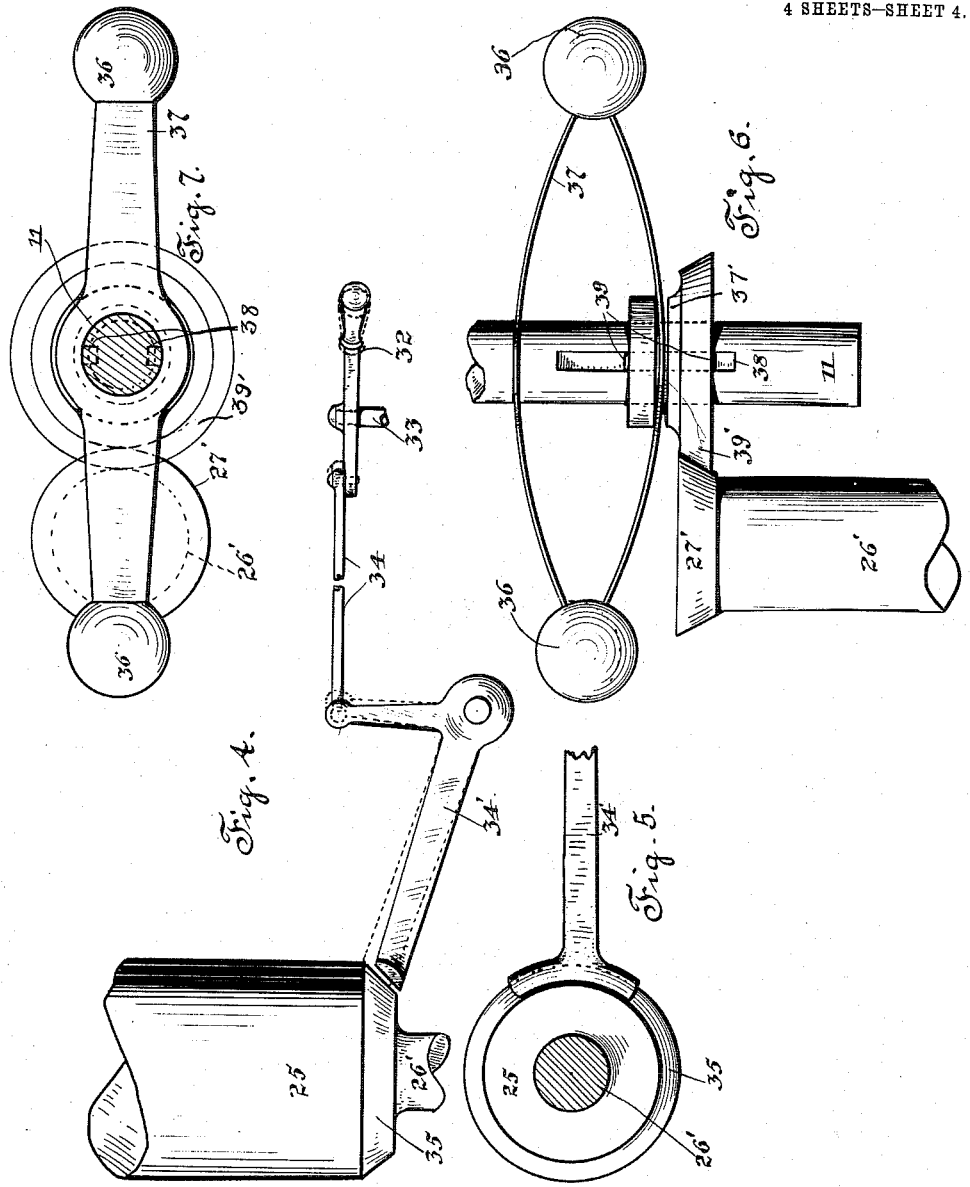

UNITED STATES PATENT OFFICE.

ISAAC SMYTH, OF CHICAGO, ILLINOIS.

AUTOMOBILE.

995,037.

Specification of Letters Patent.   Patented June 13, 1911.

Application filed December 13, 1909.   Serial No. 532,930.

*To all whom it may concern:*

Be it known that I, ISAAC SMYTH, a citizen of the United States, residing at Chicago, county of Cook, and State of Illinois, have invented certain new and useful Improvements in Automobiles, of which the following is a specification.

My invention relates to improvements in automobiles and more particularly to a propelling means therefor, the object of the invention being the production of a machine which shall be driven by the force of gravity.

A further object of my invention is to provide adequate means whereby the propelling means may be controlled for starting, braking, and stopping the vehicle, and automatic means for governing the speed of the same.

Other objects will appear hereinafter.

With these objects in view my invention consists in the novel construction and arrangement of parts which will be hereinafter fully described and particularly pointed out in the appended claims.

Figure 1:
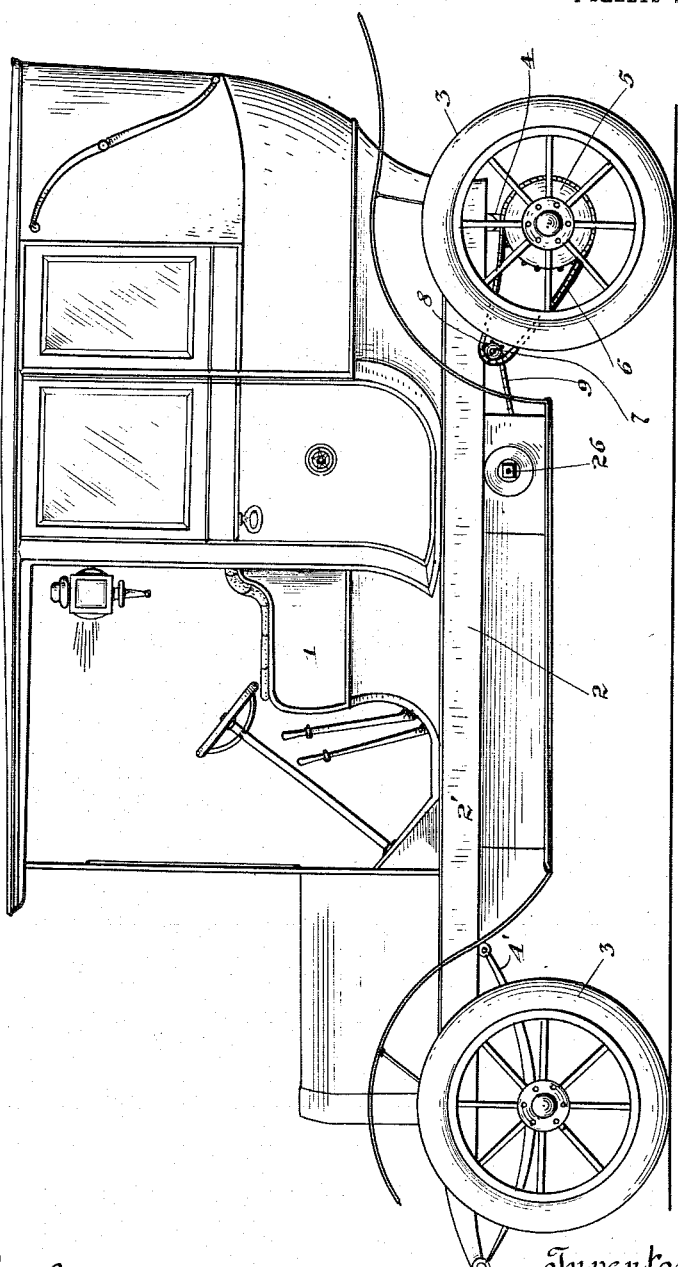
Figure 2:
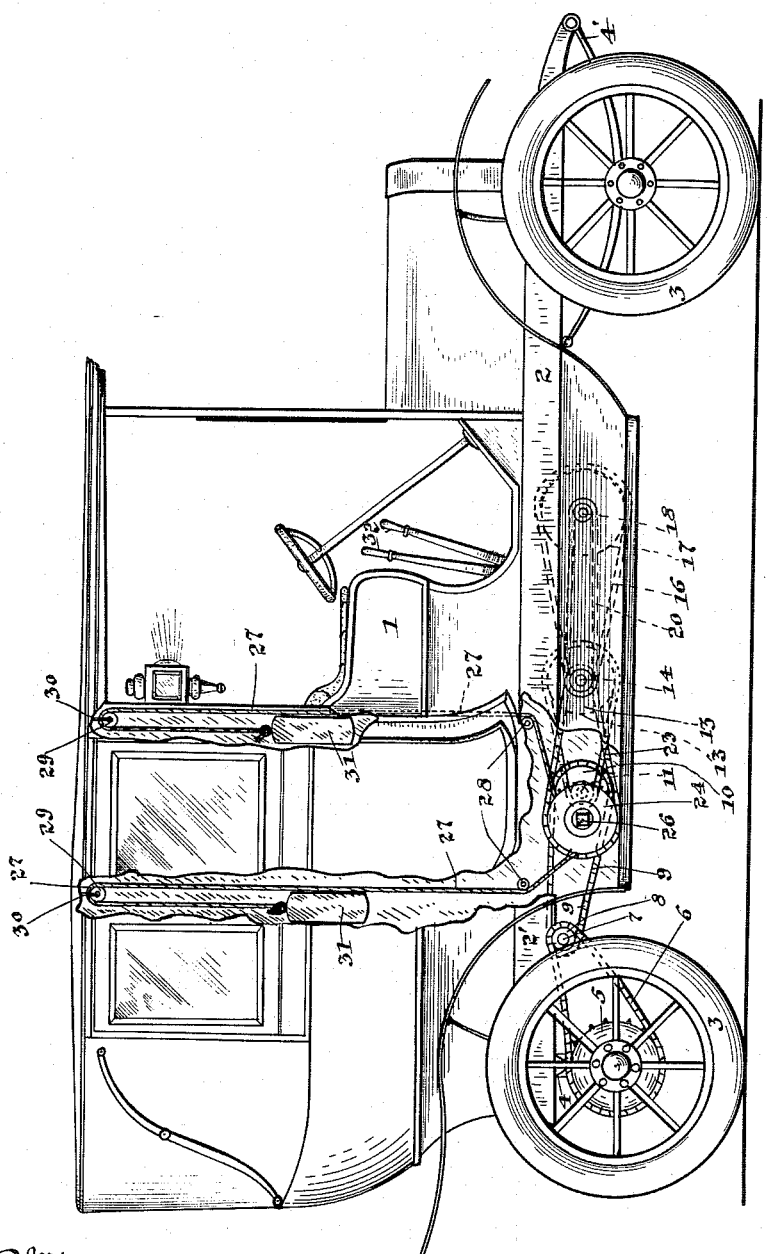
Figure 3:
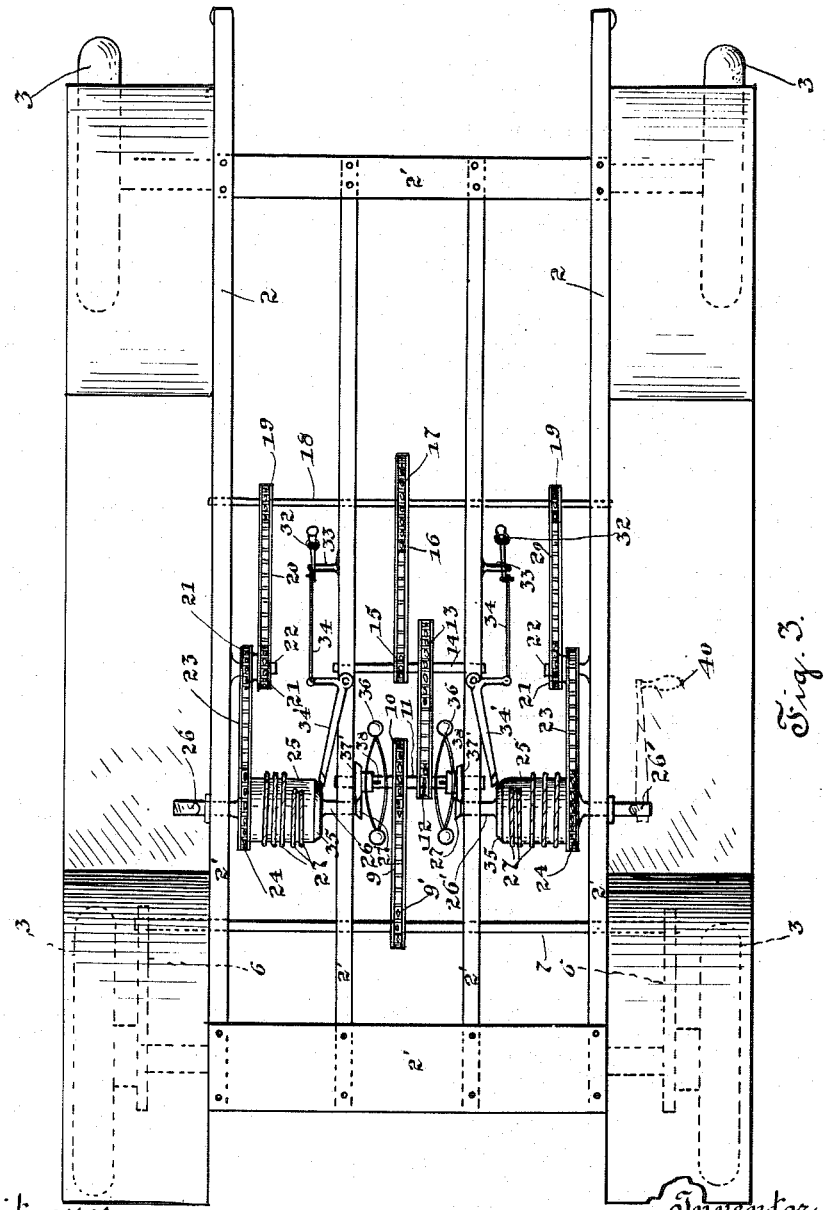

My invention will be best understood by reference to the accompanying drawings forming a part of this specification, and in which, Figure 1 is a side elevation of my improved automobile in its preferred form and showing the neat external appearance thereof, Fig. 2 is also a side elevation, parts being broken away to expose the operating mechanism, Fig. 3 is a top plan view of the automobile chassis, Figs. 4 and 5 are respectively a detail plan view and side elevation showing the brake apparatus, and Figs. 6 and 7 are respectively a detail plan view and side elevation showing the automatic speed governor or regulator of the vehicle.

Referring now to the drawings 1 designates the automobile body and 2 the chassis or running-gear carrying the same, the latter comprising the major portion of the operating or controlling mechanism. While the latter may be inadequate for long distance runs without excessive cranking, it is particularly adapted for short runs for city use or for use on the stage of theaters in certain plays in which the automobile figures as a factor. Toys also may be constructed on this principle. The usual wheels 3 and supporting springs 4 and 4′ are provided to support the chassis frame 2′, and on the rear axles sprockets 5 are secured and driven by chains 6 in the usual manner. The driving shaft 7 carries at the ends thereof the driving sprockets 8 as clearly shown in Figs. 1 and 2. The driving shaft 7 is driven by means of the chain 9 which travels over the sprockets 9′ and 10, the latter being secured to the governor shaft 11. The sprocket 12 which is secured to the shaft 11 as shown connects with the sprocket 13 and is driven thereby, the latter sprocket being secured to the shaft 14. Sprocket 15 is secured to the shaft 14 and is driven by the chain 16 which travels over and is driven by the sprocket 17, the latter being secured to the shaft 18. The shaft 18 extends across the chassis frame 2′ and is provided with sprockets 19 adjacent the outer ends thereof. The latter sprockets are driven by the chains 20 which travel over the double sprockets 21 which are mounted on the studs 22 which extend inwardly from the outer members of the frame 2′. The sprockets 21 are driven by the chains 23 which in turn are driven by the sprockets 24 arranged at the outer end of the rotatable drums 25. These drums are provided with shafts 26 and 26′ which are journaled in the frame 2′ the said shafts projecting outwardly as shown in Fig. 3.
The cords 27 are secured to the drums 25 and adapted to wind about the same during rotation thereof, and said cords extend upwardly and pass over the pulleys 28 and 29 as clearly shown in Fig. 2. The pulleys 29 are suspended from the top of the body by means of hangers 30. Weights 31 are provided and secured to one end of the cords 27, said weights being adapted to move vertically on the inside of body 1.

From the foregoing description it is clear that when the drums 25 are rotated in one direction that the weights 31 will be elevated and that said drums will rotate in the opposite direction by means of gravity acting on said weights. The winding up of drums 25 may be effected by elevating the rear wheels from contact with the ground.

In order to control the rotation of the drums 25 hand levers 32 are provided which are mounted on studs 33 which are provided in the frame 2′. By means of the connecting rods 34 the lower ends of the levers 32 are connected to the respective bell crank levers 34′, one end of each of the latter be- 1
ing provided with a brake shoe, which shoes impinge against the bevel faces 35 provided at the inner end of the drums 25. Thus it will be seen that when a hand lever 32 is moved rearwardly that a drum 25 will be retarded in its rotary movement by means of the friction between the brake shoe and the bevel surface 35.

The speed governor comprises balls 36 which are mounted at the outer extremities of leaf springs 37, one of the latter being rigidly secured to the governor shaft 11. The other spring is mounted in a grooved collar 37' which is adapted to slide freely on the shaft 11 and prevented from rotating thereon by means of the key-way 38, the key 39 integral with said collar projecting into said key-way. A disk 39' is provided on the collar 37' the periphery of which is beveled and adapted to impinge upon the bevel face 27' formed on the inner end of each shaft 26'. The balls 36 of the governor when at a high rotative speed fly outwardly by centrifugal force and thus tend to increase the effect of the springs 37, and since the collar 37' is connected with one of said springs the disk 39' impinges upon the bevel face 27', the amount of pressure between said disk and said bevel face being determined by the centrifugal force of said balls. The governor may be made so as to cause any desired friction between the dog 39' and the bevel face 27', and hence the automobile may run at a predetermined speed. The outer ends of the shafts 26 and 26' are squared and cranks 40 indicated by dotted lines are provided to crank said shafts.

Having described my invention what I claim as new and desire to secure by Letters Patent is:

1. In an automobile, a chassis and a body provided with a door way, a drum rotatably mounted on said chassis, a pulley suspended in said body adjacent the top and at one side of the door way, a cord wound about said drum and passing over said pulley, a weight on the free end of said cord, a transverse shaft, gearing connecting said transverse shaft and said drum, a governor shaft, gearing connecting said governor shaft with said first mentioned shaft, co-acting beveled friction disks on said governor shaft and said drum, a governor on said governor shaft for actuating the said disk on said shaft, a drive shaft, gearing connecting said governor shaft and said drive shaft, traction wheels and gearing connecting said drive shaft and said traction wheels, substantially as described.

2. In an automobile, a chassis and a body provided with a door way, in combination with an operator's seat, a drum rotatably mounted on said chassis, a pulley suspended in said body adjacent the top thereof and at one side of said door way, a cord wound about said drum and passing over said pulley, a weight on the free end of said cord, a transverse shaft, gearing connecting said transverse shaft and said drum, a governor shaft, gearing connecting said governor shaft with said first mentioned shaft, friction disks on said governor shaft and said drum having co-acting beveled edges, a governor on said governor shaft for actuating the disk on said shaft, a drive shaft, gearing connecting said governor shaft and said drive shaft, traction wheels, gearing connecting said drive shaft and said traction wheels, a beveled face on said drum, a brake lever adjacent said seat, a bell crank lever having a friction end on one of its arms adapted to engage the beveled face on said drum and a link connecting said brake lever and said bell crank lever, substantially as described.

In testimony whereof I have signed my name to this specification in the presence of two subscribing witnesses.

ISAAC SMYTH.

Witnesses:
JANET E. HOGAN,
JOSHUA R. H. POTTS.